United States Patent [19]
Keruzore

[11] Patent Number: 5,853,261
[45] Date of Patent: Dec. 29, 1998

[54] LOCK FOR AN ADJUSTING SCREW OF A CAR LIGHT OPTICAL BLOCK

[75] Inventor: Alain Keruzore, São Paulo, Brazil

[73] Assignee: Cibie Do Brasil Ltda., Sao Paulo, Brazil

[21] Appl. No.: 877,234

[22] Filed: Jun. 17, 1997

[30] Foreign Application Priority Data

Jul. 23, 1996 [BR] Brazil ................................. 9603140-9

[51] Int. Cl.[6] ................................................ B60Q 1/06
[52] U.S. Cl. ........................... 403/350; 362/289; 403/326
[58] Field of Search .................... 403/326, 327, 403/328, 350, 348, 76, 122, 13, 14, 321, 141, 142, 143; 362/66

[56] References Cited

U.S. PATENT DOCUMENTS

| | | | |
|---|---|---|---|
| 4,386,949 | 6/1983 | Bassi | ........................................ 55/507 |
| 4,894,754 | 1/1990 | Levilain | ..................................... 362/66 |
| 4,974,123 | 11/1990 | Luallin et al. | ............................. 362/66 |

*Primary Examiner*—Anthony Knight
*Assistant Examiner*—David Bochna
*Attorney, Agent, or Firm*—Steinberg & Raskin, P.C.

[57] ABSTRACT

A lock assembly, for securing an adjusting screw engaging with a frame of a car to a car light optical block to lock the optical block to the frame of the car, including a female member connected to the optical block having at least one aperture formed therein and a male member having a first portion and a second portion. The first portion is insertable in the aperture of the female member and includes a locking mechanism for locking the male member to the female member. The second portion includes a receiving mechanism for receiving an end of the adjusting screw. A second locking mechanism is provided for locking the adjusting screw in the receiving mechanism.

11 Claims, 2 Drawing Sheets

LOCK FOR AN ADJUSTING SCREW OF A CAR LIGHT OPTICAL BLOCK

FIELD OF THE INVENTION

The present invention relates to a lock for an adjusting screw of a car light optical block and, more particularly, to an assembly for positioning and axially retaining an adjusting screw installed between a car frame and the optical block of car lights.

BACKGROUND OF THE INVENTION

As is well known to those skilled in the art, prior art car lights generally comprise an installation frame and an optical block. The lights are mounted in the vehicles by fastening such frame to the structure of the vehicle body. To adjust the optical block relative to the frame and, consequently, relative to the vehicle body, after installation is made thereupon, a set of fastening and adjusting screws are provided which determine the distance and angle of the optical block relative to the frame of the car light which is fastened to the car body.

Generally, one portion of the fastening screws pass through holes which are internally threaded in proper sites of the frame structure. The other portion of the fastening screws have spherical ends which are set into concave and/or half-elliptical housings of the optical block ensuring that the fastening screws are stable within the optical block and further allowing the rotational displacement of the screw relative to the optical block. This fastening screw/optical block arrangement determines the distances and planes of positioning between them.

Although commonly used, the conventional means for fastening the adjusting screws to the optical blocks have some disadvantages. For example, the external vibrations which are common in vehicles in motion may eventually cause the screws to loosen or unfasten, thereby detrimentally altering the light beam of the car lights. In more extreme conditions, the vibrations may cause the total detachment of the optical block from the frame.

OBJECTS AND SUMMARY OF THE INVENTION

One of the objects of the invention is to provide a lock for the adjusting screw of the car light optical block that solves the problems caused by vibrations occurring externally to the car light assembly.

Another object of the invention is to provide a lock for the adjusting screw of the car light optical block that prevents the optical block from becoming detached from the car light frame.

These and other objects of the present invention which will become apparent from the following description are achieved by a lock assembly for the adjusting screw of the car light optical block which comprises a tubular base radially incorporating substantially triangular-shaped projections. The projections have holes through which fastening screws of the tubular base pass in order to fasten the base to the rear wall of the light reflector. An element of radial locking is situated coaxially to the tubular base, e.g., by clicking. The element of radial locking is defined by a radially resilient jacket having, at its lower portion, four swallow tail-shaped fingers which enable the unidirectional and axial locking of the element of radial locking relative to the tubular base. The upper portion of this jacket comprises a radially resilient spherical recess in which the spherical tip of the adjusting screw is inserted and selectively locked using radial stress. The spherical tip of the adjusting screw is inserted within this recess and the body of the adjusting screw passes through and interacts with the internal thread of a corresponding through hole formed in the car light frame. The upper portion of the jacket further comprises an external annular edge and a radial lever having a conical shoulder which contacts a portion of an annular edge concentrically incorporated to the tubular base. The annular edge which receives the conical shoulder of the radial lever has a ramped portion with a travel that is limited by dead stops. The ramped travel ensures that the angular displacement of the lever from the lowest end to the highest end of the ramp causes a small axial displacement of the jacket relative to the tubular base. This axial displacement creates a radial stress of the jacket around the spherical end of the adjusting screw thereby locking the adjusting screw relative to the optical block. The ramp of the annular edge further includes an abrupt depression situated after its highest end and adjacent to one of its dead stops which serves as a radial locking tread of the jacket relative to the tubular base.

In one particular, more general embodiment of the invention, the lock assembly engaging with a frame of a car for securing an adjusting screw to a car light optical block to lock the optical block to the frame of the car comprises a female member connected to the optical block having at least one aperture formed therein. The lock assembly further comprises a male member having a first portion and a second portion, the first portion being insertable into the aperture of the female member and comprising first locking means for locking the male member to the female member. The second portion comprises receiving means for receiving an end of the adjusting screw. Second locking means are provided for locking the adjusting screw in the receiving means of the male member.

In certain embodiments of the invention, the female member includes a tubular base having a pair of substantially triangular-shaped projections attached to opposite sides thereof and the first locking means include a plurality of fingers fixedly engageable with the tubular base. Each of the projections of the tubular base have apertures formed therein for receiving fastening screws for fastening the tubular base to the car light optical block. The second locking means include a radial lever fixed to the male member that is movably engageable with the tubular member.

BRIEF DESCRIPTION OF THE INVENTION

A more complete appreciation of the present invention and many of the attendant advantages thereof will be readily understood by reference to the following detailed description when considered in connection with the accompanying drawings in which.

DETAILED DESCRIPTION OF THE PREFERRED EMBODIMENTS

Figure 4:
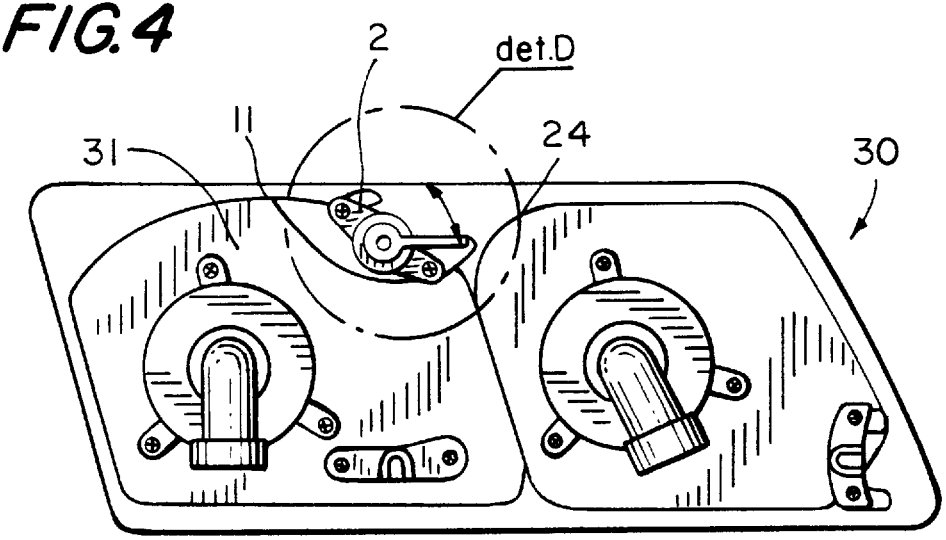
FIG. 4 is a rear view of the vehicle light, illustrating in detail "D" the positioning of the lock for adjusting screw of the optical block of its vehicle light.
Figure 5:
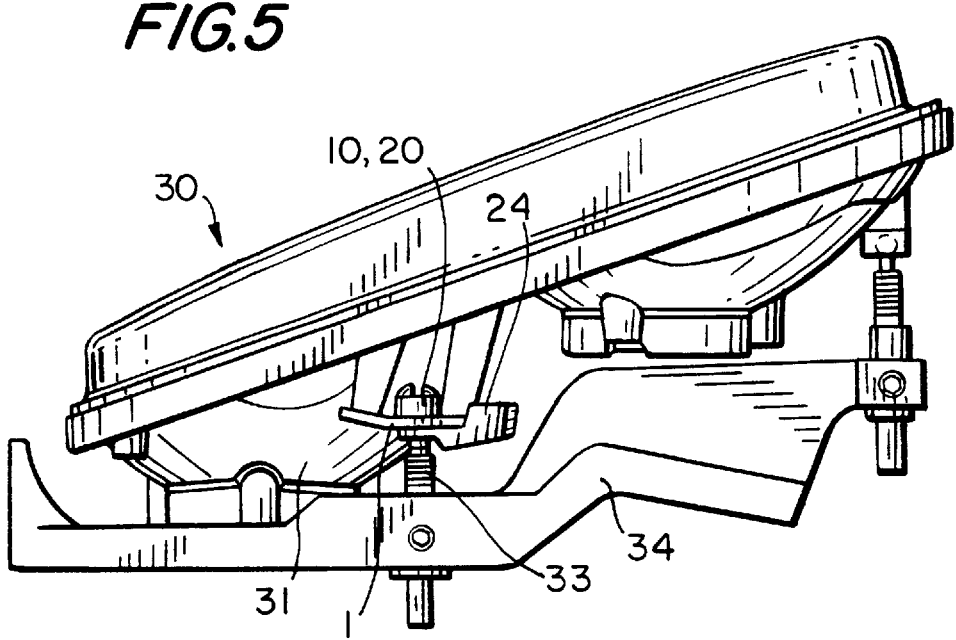
FIG. 5 is a top view of the car light illustrated in FIG. 4.

Referring to the drawings, wherein like reference characters designate identical or corresponding parts throughout the various views, the lock for an adjusting screw of the car light optical block comprises a female member 10. Female member 10 comprises a tubular base 40 which incorporates in its frontal annular edge 1 a pair of substantially triangular-shaped radial projections 2 each having a hole 3. Fastening screws 11 pass through the holes 3 in order to fasten the female member 10 to a reflector back wall 31 of a car light 30 (FIGS. 4 and 5). Tubular base 40 includes an aperture 42 formed substantially in the center thereof.

A male member or element of radial locking 20 is arranged coaxially to this tubular base 40 and locked thereto, e.g., by clicking, via first locking means 41 situated at a lower portion of male member 20. Locking means 41 are defined by four swallow tail-shaped fingers 21 which, when inserted into aperture 42 of tubular base 40, enable the unidirectional and axial locking of the male member 20 relative to the tubular base 40. Specifically, the fingers 21 are arranged so that when inserted through the aperture 42, they are forced inwardly. After passing through the aperture 42, the fingers 21 snap outward and, with the aid of small protrusions 44 extending from the lower ends of the fingers 21, lock male member 20 to the tubular base 40.

The upper portion of male member 20 is provided with receiving means 22 defined by a radially resilient spherical recess for receiving a spherical tip 32 of an adjusting screw 33. Specifically, the recess defining the receiving means 22 is slightly smaller than the spherical tip 32 of the adjusting screw 33 so that when the spherical tip 32 is inserted therein, the walls defining the recess are forced outward and, thereafter, exert an inward pressure on the spherical tip 32 of the adjusting screw 33.

The body of the adjusting screw 33 is provided with threads which pass through and interact with an internal thread of a corresponding through hole provided in a frame 34 of the car light 30. With such an arrangement, one portion of the adjusting screw 33 is secured to the frame 34 of the car light 30 and the other portion of the adjusting screw 33 is secured to male member 20 within receiving means 22.

Male member 20 further includes second locking means for locking the spherical tip 32 of the adjusting screw 33 within male member 20. The second locking means include an upper external annular edge 23 and a radial lever 24 extending from the edge 23 and including a conical shoulder (not shown in its bottom face) located near the portion of the radial lever 24 which contacts a portion of the front annular edge 1 of the tubular base 40. The front annular edge 1 of the tubular base 40 includes a ramped portion 4 having its travel limited by dead stops 5. The ramped travel 4 ensures that the angular displacement of the lever 24 from the lowest end to the highest end of this ramp 4 causes a small axial displacement of the male member 20 relative to the tubular base 40. This axial displacement consequently causes a radial stress of the spherical recess 22 around the spherical end 32 of the adjusting screw 33, thereby locking the screw relative to the optical assembly.

After its highest end and adjacent to one of the dead stops 5, the ramp 4 includes an abrupt depression 6 which serves as a radial locking tread in which radial lever 24 of the male member 20 rests. As such, after the axial displacement of the male member 20 relative to the tubular base 40 (whereby a radial stress of the spherical recess 22 around the spherical end 32 of the adjusting screw 33 is created), the radial lever 24 is situated within depression 6. Conversely, after such radial stress is released, the radial lever 24 is moved and situated at the lowest end of the ramp 4 at one of the stops 5.

The tubular base 40 further includes an annular ridge 43 situated substantially around the outer peripheral edge of the tubular base 40. Annular ridge 43 is designed to support upper external annular edge 23 of male member 20 when the male member 20 is arranged within the tubular base 40.

In light of the apparatus discussed above, the method for locking an adjusting screw to a car light optical block will now be discussed. Initially, the tubular base 24 is secured to the reflector back wall 31 of the car light 30 (FIGS. 4 and 5). This is accomplished by inserting screws 11 through the holes formed in the triangular-shaped projections of the tubular base 24 and thereafter fastening the screws in threaded bores formed in the reflector back wall 31 of car light 30, e.g., with the aid of a screwdriver.

After the tubular base 24 is secured to the car light 30, the male member 20 is inserted into aperture 42 and locked therein. Specifically, the fingers 21 of the bottom portion of male member 20 are inserted into aperture 42 while applying a moderate inward pressure to the fingers 21. As the small protrusions at the lower ends of the fingers 21 emerge from aperture 42, the fingers snap outward and lock the male member 20 to the tubular base 24.

After the male member 20 is secured to the tubular base 40, the spherical end 32 of the adjusting screw 33 is inserted into the spherical recess 22 of male member 20. At this moment, the adjusting screw is secured to male member 20 but susceptible to the disadvantages discussed above cause by the external vibrations of the car. As such, the adjusting screw is in its "secured and unlocked" position. It is noted that the adjusting screw 33 can be inserted into male member 20 before male member 20 is locked to the tubular base 40.

Figure 1:
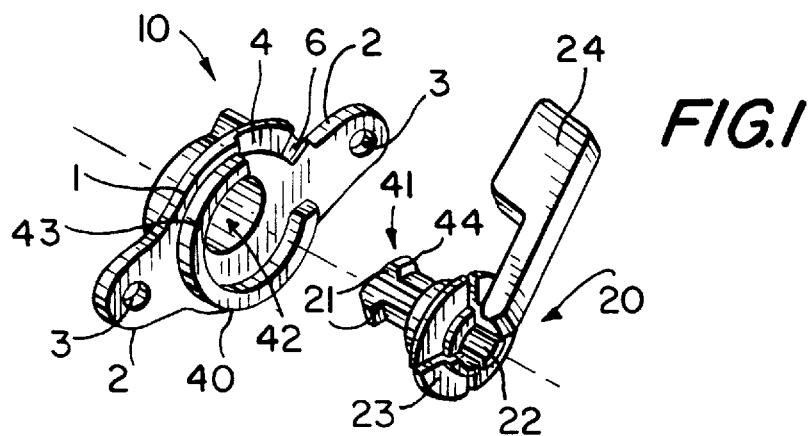
FIG. 1 is an exploded perspective view of the lock for the adjusting screw of the light optical block in accordance with the present invention.
Figure 2:
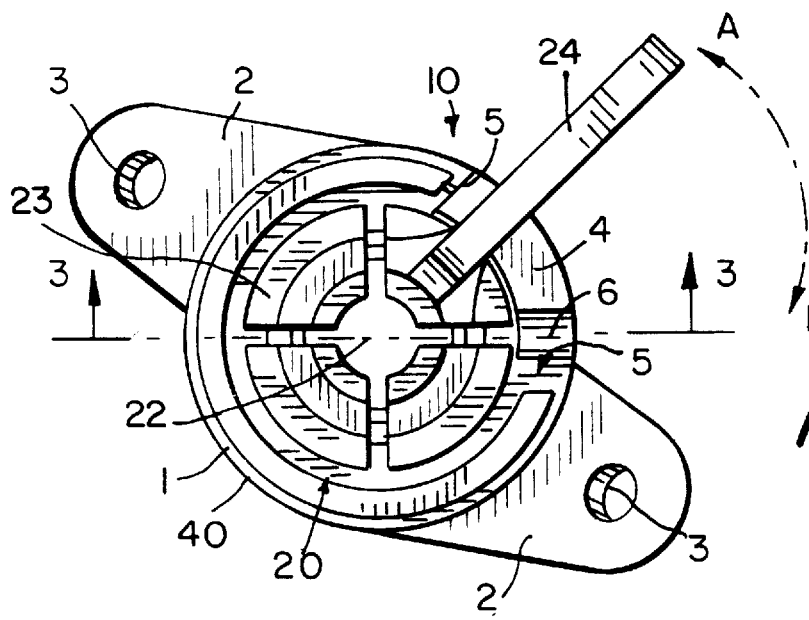
FIG. 2 is a front view of the lock for the adjusting screw of the light optical block, as mounted, being illustrated through the arrows "A" and "B", the start and end of travel of its locking lever.
Figure 3:
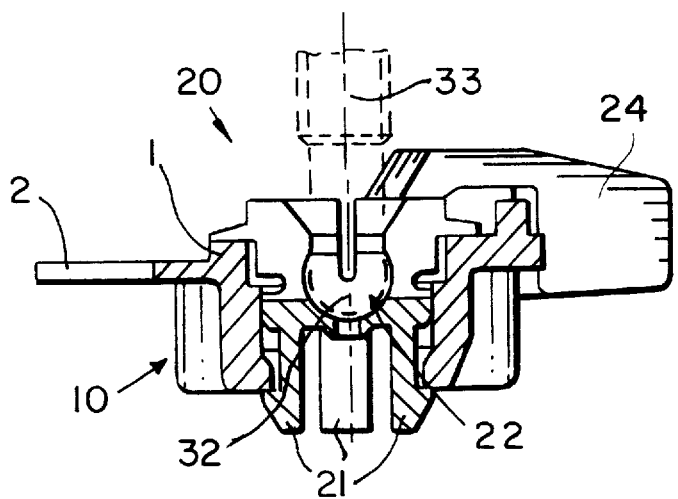
FIG. 3 is a section of the lock for the adjusting screw of the light optical block, taken along the line 3—3 of FIG. 2.

Once inserted, the radial lever 24 is displaced from position A to position B as illustrated in FIG. 2. When the radial lever 24 is in position A, i.e., resting at the lower end of ramp portion 4, the adjusting screw 33 is in the secured and unlocked position within male member 20. However, when the radial lever is placed in position B, i.e., resting in the depression 6, a small axial displacement of the male member 20 relative to the tubular base 40 is caused thereby creating a radial stress of the spherical recess 22 around the spherical end 32 of the adjusting screw 33. Therefore, when the radial lever is placed in position B, the adjusting screw 33 is in its secured and locked position within male member 20.

Obviously, numerous modifications and variations of the present invention are possible in light of the teachings hereof. For example, the means for locking the male member to the female member can comprise a device other than the fingers. In addition, the means for locking the adjusting screw to the male member can comprise, for example, any means for creating the radial stress of the spherical recess of the male member around the spherical end of the adjusting screw. Therefore, it is to be understood that the invention can be varied from the detailed description above within the scope of the claims appended hereto.

What is claimed is:

1. A lock assembly for securing an adjusting screw engaging with a frame of a car to a car light optical block to lock the optical block to the frame of the car, comprising:

a female member adapted to be connected to the optical block and having at least one aperture formed therein and a tubular base having a top face and a bottom face;

a male member having a first portion and a second portion, said first portion being insertable in said aperture of said female member and comprising first locking means for locking said male member to said female member, and said second portion comprising receiving means for receiving an end of the adjusting screw, and second locking means for locking the adjusting screw in said receiving means, said second locking means comprising a radial lever fixed to said second portion of said male member, said radial lever being movable engageable with said tubular base, and wherein said tubular base further comprises an annular edge having a ramped portion, a depressed portion and at least one stop and wherein said radial lever of said male member is movable between a first unlocked position in which said radial lever rests on said ramped portion and a second locked position in which said radial lever rests in said depressed portion and an annular ridge extending substantially around said annular edge.

2. The lock assembly according to claim 1, wherein said tubular base includes a pair of substantially triangular-shaped projections attached to opposite sides thereof, wherein each of said projections have apertures formed therein for receiving fastening screws for fastening said tubular base to the car light optical block.

3. The lock assembly according to claim 1, wherein said first locking means comprise a plurality of fingers, said fingers being insertable into said aperture of said female member.

4. The lock assembly according to claim 3, wherein each of said plurality of fingers has a first end attached to said male member and a second free end, each of said plurality of fingers including a small protrusion extending from its free end which, after passing through said aperture of said female member, engages said bottom face of said tubular base and locks said male member to said tubular base.

5. The lock assembly according to claim 1, wherein said receiving means of said male member comprise a radially resilient spherical recess in which a spherical tip of the adjusting screw is insertable.

6. The lock assembly according to claim 1, wherein said second portion of said male member further comprises an external annular edge.

7. The lock assembly according to claim 1, wherein said annular ridge of said female member is engageable with said external annular edge of said male member.

8. A method for securing an adjusting screw engageable with a frame of a car to a car light optical block to lock the optical block to the frame of the car, comprising the steps of:

securing a female member having a tubular base having holes formed therein to a rear surface of the car light optical block by inserting screws through the holes and fastening the screws in threaded bores formed in the rear surface of the car light optical block;

locking a male member having a recess to the female member;

inserting the adjusting screw into the recess of the male member by inserting a spherical end of the adjusting screw into a radially resilient spherical recess of the male member;

locking the adjusting screw to the male member by moving a radial lever of the male member from a first unlocked position in which the radial lever rests on a ramped portion of the tubular base to a second locked position in which the radial lever rests in a depressed portion of the tubular base; and securing the adjusting screw to the frame of the car.

9. The method according to claim 8, wherein said step of locking the male member to the female member comprises inserting a portion of the male member into an aperture of the female member.

10. The method according to claim 9, wherein the portion of the male member inserted into the aperture of the female member comprises a plurality of fingers. base.

11. The method according to claim 8, comprising creating a radial stress of the spherical recess around the end of the adjusting screw while moving the radial lever from the first unlocked position to the second locked position.

* * * * *